Aug. 6, 1957

F. G. TIMMEL ET AL 2,802,119

PULSE GENERATOR

Filed Oct. 17, 1955

WITNESSES

Edwin C. Bassler

T. N. Murray

INVENTORS
Floyd A. Baker &
Frederick G. Timmel
BY
F. E. Browder
ATTORNEY

United States Patent Office 2,802,119

Patented Aug. 6, 1957

2,802,119

PULSE GENERATOR

Frederick G. Timmel, Baltimore, Md., and Floyd A. Baker, Los Angeles, Calif., assignors to Westinghouse Electric Corporation, East Pittsburgh, Pa., a corporation of Pennsylvania Application October 17, 1955, Serial No. 540,886

6 Claims. (Cl. 307—106)

This invention relates generally to pulse generators and, more particularly, to a pulse generator which is constructed from saturable inductive elements exclusively.

It is an object of this invention to provide a new and improved pulse generator.

It is another object of the invention to provide a pulse generator constructed exclusively from inductive and resistive elements. In this way the overall size of the generator is reduced and its susceptibility to vibration and shock is greatly reduced over pulse generators employing vacuum or gas tubes.

A still further object of the invention lies in the provision of means for producing output pulses with the use of only two saturable inductance elements.

The details of the invention, together with other objects and features thereof, will become apparent from the following detailed description, taken in connection with the accompanying drawings which form a part of this specification and in which.

Figure 1:
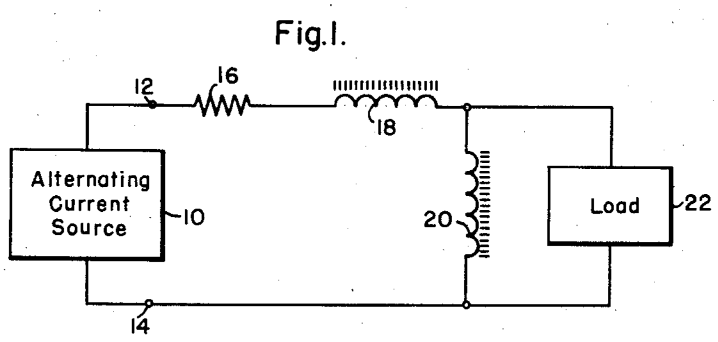
Figure 1 is a schematic diagram of one embodiment of the invention which employs two saturable reactors.

Referring to Fig. 1, the circuit shown includes a source of alternating current voltage 10 having two output terminals 12 and 14. In series between terminals 12 and 14 are a resistance 16, a first saturable inductor 18 and a second saturable inductor 20. In shunt with inductor 20 is a load impedance 22.

Reactors 18 and 20 have cores formed from rectangular hysteresis loop material. This material, well known to those skilled in the art, has a sharp cut off point between conditions of saturation and unsaturation so that the impedance of the reactors can change almost instantaneously from a relatively high value to almost zero. To understand the operation of the circuit, an examination of the induced voltage equation for an inductor should be made. This equation is:

$$B=\frac{k}{NA}\int edt$$

where $B$=flux density in webbers per square unit of area;
$k$=constant determined by the core material;
$N$=number of turns of wire in the winding of the inductor;
$A$=cross sectional area of the core of the inductor;
$e$=instantaneous voltage; and
$t$=time in seconds.

After the flux density B reaches a certain value, the reactor will saturate. It should be obvious that the time required for saturation can be varied by varying any one of the factors outlined above. In the circuit of Fig. 1, reactor 18 is designed to saturate before reactor 20.

Figures 3A, 3B, 3C, 3D:
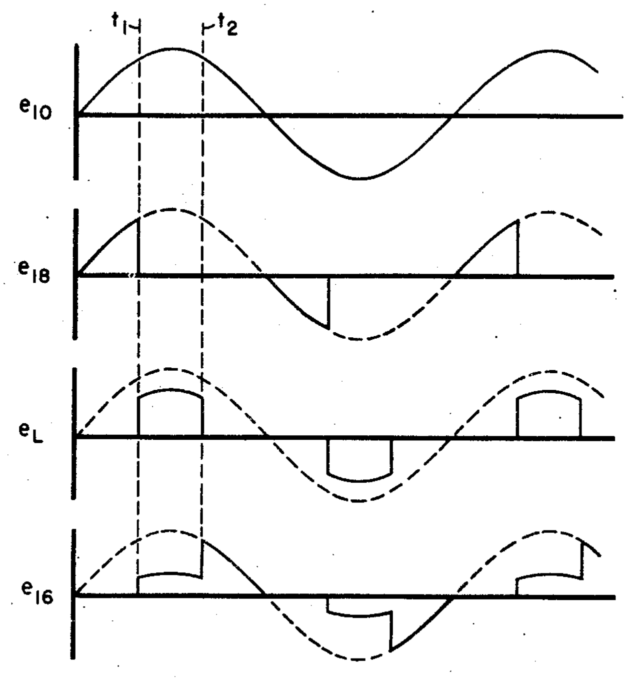

Operation of the circuit can best be understood by reference to Fig. 3. The applied voltage $e_{10}$ from voltage source 10 is a sine wave. Initially, both reactors 18 and 20 will be unsaturated; however, the impedance of reactor 20 and load 22 in parallel will be much less than the impedance of reactor 18. Consequently, substantially all of the applied voltage will appear across reactor 18 as $e_{18}$ (Figure $3b$) during the initial part of the cycle. At time $t_1$, reactor 18 will saturate and its impedance will drop to almost zero. Therefore, after time $t_1$, substantially all of the applied voltage will appear across reactor 20 and load 22 as $e_L$ (Figure $3c$). At time $t_2$, reactor 20 will saturate, and the load voltage $e_L$ will drop to zero since reactor 20 now appears as a short circuit. Resistance 16 is included in the circuit to absorb energy during the portion of the cycle that both reactors are saturated. The voltage across resistance 16 will appear as the wave form $e_{16}$ shown in Figure $3d$. It can be seen that an output voltage pulse will appear across load 20 between times $t_1$ and $t_2$ during each half cycle of the applied sine wave.

Figure 2:
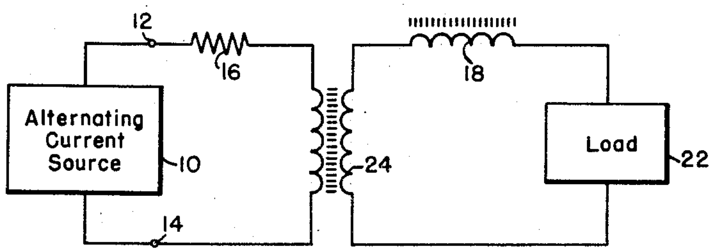
Fig. 2 is a schematic diagram of another embodiment of the invention which employs a saturable reactor together with a saturable transformer; and Figs. $3a$ through $3d$ are wave forms illustrating the operation of the circuits shown in Figs. 1 and 2.

The circuit of Figure 2 employs a saturable transformer 24 to replace reactance 20 in Figure 1. All other elements in Figure 2 which correspond to elements shown in Figure 1 are designated by like reference numerals. The operation of the circuit is similar to that of Figure 1. Reactor 18 is designed to saturate before transformer 24. During the first part of the applied since wave, all of the voltage across the secondary winding of transformer 24 will appear across reactor 18 since the reactor, when unsaturated, has a much larger impedance value than load 22. When reactor 18 saturates, its impedance drops to almost zero, and, therefore, an output voltage will appear across load 22. When transformer 24 saturates the load voltage will disappear and all of the applied voltage will appear across resistor 16. This process is repeated during each half cycle of the applied sine wave to produce a series of output voltage pulses of alternate polarity.

Although the invention has been described in connection with two specific embodiments, it will be readily apparent to those skilled in the art that various changes in form and arrangement of parts can be made without departing from the spirit and scope of the invention.

We claim as our invention:

1. In combination with a source of alternating current voltage, a pulse generator connected to said voltage source, said generator including a first saturable inductance designed to saturate after a first predetermined amount of time has elapsed during one half cycle of said alternating current source, a second saturable inductance designed to saturate after a second predetermined amount of time has elapsed during said one half cycle, said first predetermined time elapse being shorter than the second predetermined time elapse, and a load impedance responsive to voltages produced across said second inductance exclusively.

2. A pulse generator comprising a source of alternating current voltage, a pair of output terminals for said voltage source, a first saturable reactor, a second saturable reactor and an impedance element all connected in series between said terminals, a load impedance connected in shunt with said second reactor, the parallel combination of said second reactor and said load impedance having a lower effective impedance than said first reactor when it is unsaturated, and said first reactor being designed to saturate before said second reactor.

3. A pulse generator comprising a first saturable reactor, a second saturable reactor and an impedance element all connected in series, a source of alternating current voltage sufficient to saturate both of said reactors and connected across the series combination of said reactors and said impedance element, a load impedance connected in shunt with said second reactor, the parallel combination of said second reactor and said load impedance having a lower effective impedance than said first reactor when it is unsaturated, and said first reactor being designed to saturate before said second reactor whereby an output pulse will appear across said load impedance once during each half cycle of the said applied alternating current voltage source.

4. For use with a source of alternating current voltage, a pulse generator comprising a transformer having primary and secondary windings and a core formed from substantially rectangular hysteresis loop material, means for applying said alternating current voltage source across said primary winding, a saturable inductor and a load impedance connected in series with the secondary winding of said transformer, said second inductor being adapted to saturate before the core of said transformer during one half cycle of said alternating current voltage source, and said load impedance having a lower impedance value than said inductor when it is unsaturated.

5. A pulse generator comprising, in combination, a pair of input terminals adapted for connection to a source of alternating current voltage, circuit means connected between said terminals and including a first saturable inductance designed to saturate after a first predetermined amount of time has elapsed during one half cycle of said alternating current source, a second saturable inductance designed to saturate after a second predetermined amount of time has elapsed during said one half cycle, said first predetermined time elapse being shorter than the second predetermined time elapse, and a load impedance connected to said inductances such that a voltage pulse will be produced thereacross during every half cycle of the alternating current source, said voltage pulse being equal in time duration to the difference between said first and second time elapses.

6. In combination with a source of alternating current voltage, a pulse generator comprising a first saturable inductance connected to said voltage source and designed to saturate after a first predetermined amount of time has elapsed during one half cycle of said voltage source, a second saturable inductance connected to said voltage source and designed to saturate after a second predetermined amount of time has elapsed during said one half cycle, and a load impedance connected to said inductances such that a voltage pulse will be produced thereacross during each half cycle of the alternating current voltage source.

No references cited.